Jan. 4, 1949.  E. W. VREDENBURG  2,458,229
VARIABLE SPEED DRIVE

Filed April 7, 1945  2 Sheets-Sheet 1

INVENTOR.
Edric W. Vredenburg
BY
ATTORNEY

Jan. 4, 1949. E. W. VREDENBURG 2,458,229
VARIABLE SPEED DRIVE
Filed April 7, 1945 2 Sheets-Sheet 2
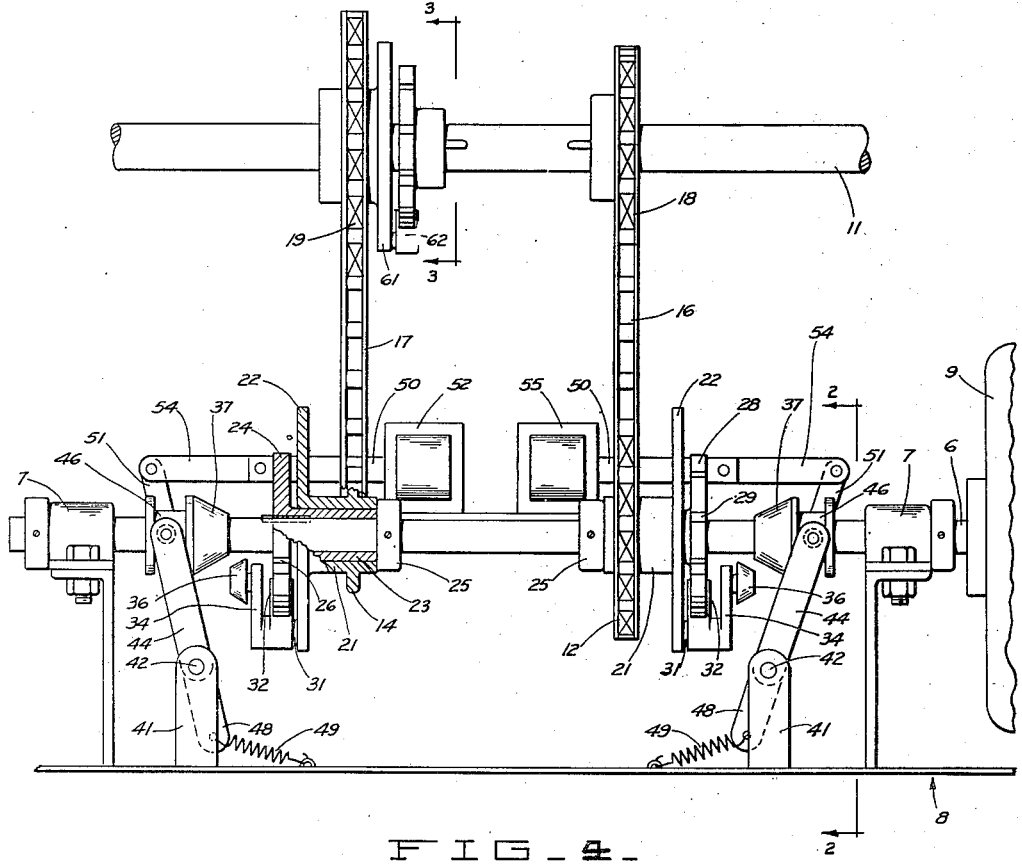
FIG_4_
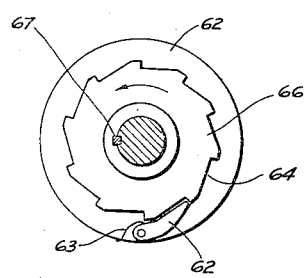
FIG_3_
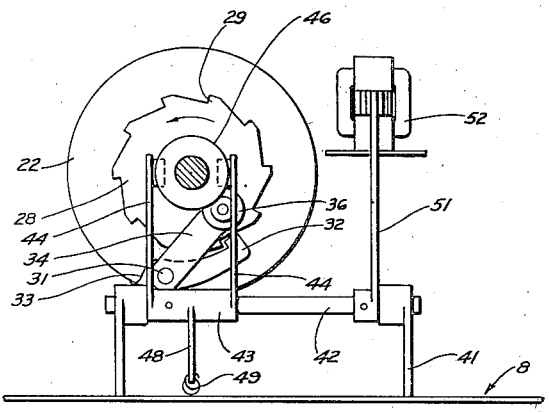
FIG_2_
INVENTOR.
Edric W. Vredenburg
BY
Robert H. Eckhoff
attorney.

Patented Jan. 4, 1949

2,458,229

UNITED STATES PATENT OFFICE 2,458,229

VARIABLE-SPEED DRIVE

Edric W. Vredenburg, Berkeley, Calif.

Application April 7, 1945, Serial No. 587,185

7 Claims. (Cl. 74—368)

This invention relates to improvements in variable speed drives.

The present invention relates to a power transmission device, particularly one enabling a practically instantaneous speed change to be effected between two or more predetermined speeds.

It is in general the broad object of the present invention to provide an improved speed change device.

A further object of the present invention is to provide a speed change device in which a positive speed change can be effected instantaneously in the rate of drive of a driven member.

The invention includes other objects and features of advantage, some of which, together with the foregoing, will appear hereinafter wherein the improved speed change device of this invention is disclosed.

In the drawing accompanying and forming a part hereof Figure 1 is a side elevation partly in section of the preferred form of speed change device.

Figure 2 is a section taken along the line 2—2 in Figure 1 and in Figure 4.

Figure 3 is a section taken along the line 3—3 in Figure 4.

Figure 4 is a view similar to Figure 1 of a modified form of structure.

Figure 1:
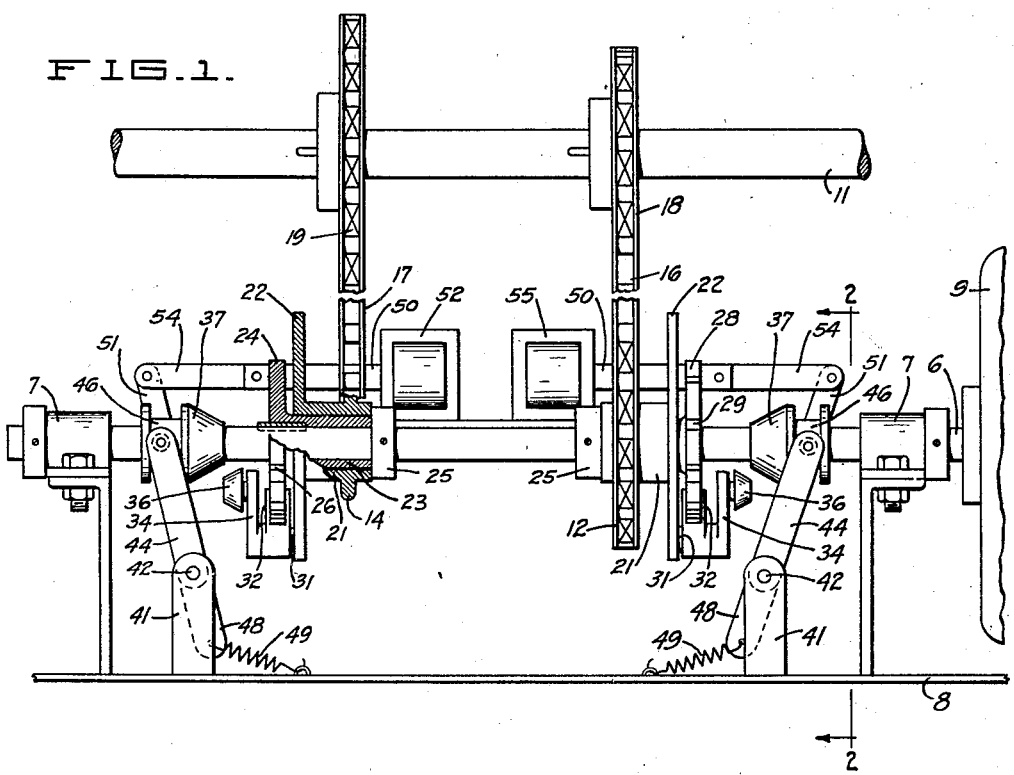

The speed change device of the present invention contemplates provision of a driving and a driven element with at least two positive drives extending between the two elements. The driving element and the driven element include at least two positive drives between the two elements, each drive being individually adapted to drive the driven element from the driver at a speed different from that provided by the other drive connection. Thus, when only two connections are provided, the driven element will be driven either at a relatively high rate or at a rate which is lower than the high rate. In accordance with this invention, the driving connections between the two elements are such that so long as the driven element is being driven at the higher rate, then the other drive connection is ineffective. However, as soon as the drive connection providing the high rate drive is rendered ineffective, the other drive connection instantaneously is energized and is effective to rotate the driving element positively at the rate which it provides.

As an embodiment of the invention I have shown in the drawing drive shaft 6, mounted in suitable bearings 7 and carried upon a base structure indicated generally by numeral 8. The shaft 6 is adapted to be driven by any suitable means and I have indicated at the right-hand side of Figure 1 the outline of an electric motor 9.

As the driven element I have indicated shaft 11 mounted in suitable bearings (not shown) for rotation.

To provide the driving connection between the driving shaft 6 and the driven shaft 11, a large sprocket 12 is provided on one side of shaft 6 and a smaller sprocket 14 is provided on the other side. Chains 16 and 17 extend from these sprockets respectively about sprockets 18 and 19 on shaft 11. Thus the drive provided by sprockets 12 and 18 and chains 16 is adapted to drive shaft 11 at a higher rate than is the drive provided by sprocket 14, sprocket 19 and chain 17.

Sprockets 12 and 14 are each formed about the periphery of an annular sleeve member 21, the member having a disc 22 secured at one end thereof. Each sleeve member is rotatable about a sleeve 23 secured for rotation with shaft 6 and positioned by collars 25. At one end and integral with the sleeve 23 provided in association with sprocket 14 is mounted a ratchet wheel 24 having a plurality of teeth 26 formed thereon and adapted to release a pawl upon rotation in one direction and to retain it upon rotation in the opposite direction. Ratchet wheel 28, provided on the other sleeve in association with sprocket 12, likewise has a plurality of teeth 29 formed about the periphery thereof to retain a pawl upon rotation in one direction and permit it to ride over the teeth upon rotation in the opposite direction. A shaft 31 extends from one side of each disc 22 and carries a pawl 32; each pawl is biased by a spring 33 to engage associated teeth 26 or 29.

To provide for selective movement of each pawl 32, an arm 34 is formed as an extension on the pawl and a wheel 36 is mounted upon one end of this arm to be selectively engaged with a slideable cone 37 slideably mounted upon the shaft 6. To move the cone selectively, brackets 41 are mounted upon the base 8 and a shaft 42 is extended between these brackets. A yoke 43 having upstanding arms 44 engaging the grooved wheel 46 associated with cone 37 moves the cone selectively. An arm 48 is provided as an extension on the yoke 43 and a spring 49 biases each cone away from the associated wheel 36.

As a convenient means for manipulating and controlling the engagement of pawls 32, a lever 51 is secured to each shaft 42 and is connected by lever 54 to slideable core 50 in solenoid structures 52 and 55.

Two solenoids are provided as indicated at 52 and 55, one to manipulate one pawl selectively and the other to manipulate the other pawl selectively. In operation, the several elements of the structure being in the position shown in Figure 1, the solenoids not being energized, and shaft 6 being positively rotated, shaft 11 will also be rotated at the highest rate of speed, sprocket 12 driving sprocket 18 through shaft 16. Because sprocket 19 is fastened positively to shaft 11 it, in turn, will drive sprocket 14 and its attached disc 22 at a higher rate of speed than ratchet wheel 24 is being driven by shaft 6. As a consequence, notched wheel 24 will be driven in counterclockwise direction in Figure 2 and pawl 32 will override the notched teeth 26.

If solenoid 55 is now energized to pull its core 50 into its associated coil portion and so move cone 37 in to engage wheel 36 and disengage pawl 32 from engagement with one of the teeth 29, the drive through sprockets 12 and 18 will cease immediately upon the pawl disengaging from the tooth in which it has been retained. The drive of disc 22 will cease instantaneously; pawl 32 on disc 22 then comes to rest against one of the teeth 26, whereupon sprocket 14 will drive sprocket 19 positively through chain 17. The drive will continue in this manner so long as solenoid 52 is not energized and solenoid 55 is energized. If solenoid 55 is de-energized the drive from sprocket 12 to sprocket 18 will be immediately resumed and that from sprocket 14 to sprocket 19 discontinued. If solenoid 55 is first energized and later solenoid 52 is energized, the drive will be entirely discontinued for pawl 32 will then be immediately disengaged from notched wheel 26. The solenoids are suitable controlled by separate switches operated off a control member as a weighing frame member in a scale to which material is fed at a rate proportional to the speed of shaft 11; such a structure is shown in my Patent 2,436,483.

In addition to the overrunning release between pawl 32 and teeth 26 or 29, one can provide a release between sprocket 19 and shaft 11 as in Figure 4. Thus, one mounts the sprocket 19 for rotation upon shaft 11 together with a disc 61 carrying a pawl 62 biased by a suitable spring 63 to engage notched wheel 64 secured on the shaft by key 67. The notches in the wheel 64 are such that the pawl can ride out of the notches so long as the wheel 64 is rotated at a greater speed than is the disc 61. In this instance, however, teeth 26 in the ratchet wheel 24 are such that the pawl cannot slip when engaged with the teeth 26 but is held positively in engagement with the teeth 26.

I claim:

1. In combination, a first shaft, a second shaft, a first drive means for driving one of said shafts from the other at a first speed, a second drive means for driving said one of said shafts from said other at a second speed less than said first speed, a first clutch associated with said first drive means and normally engaged to drive said one shaft at said first speed, an over-running clutch associated with said second drive means and effective when engaged to drive said one shaft at said second speed, said over-running clutch being ineffective to drive said one shaft at such second speed, while said first drive is effective to drive said one shaft at said one speed and cause over-running of said over-running clutch, and means for disengaging said first clutch whereby said over-running clutch ceases to over-run and said over-running clutch is rendered effective to drive said one shaft at said second speed.

2. In combination a drive shaft, a driven shaft, a first positive drive means for driving the driven shaft from the drive shaft at a first speed, a second positive drive means for driving the driven shaft from the drive shaft at a second speed less than said first speed, a first clutch on said drive shaft interposed between said drive shaft and said first positive drive means and effective when engaged to drive said driven shaft at said first speed, a second clutch on said drive shaft interposed between said drive shaft and said second positive drive means and effective when engaged to provide a drive for said driven shaft at said second speed, an over-running clutch associated with said second clutch and interposed between said second positive drive means and said driven shaft and permitting said first positive drive means to drive said driven shaft at said first speed while said first and second clutch are both engaged, and means for disengaging said first clutch to render said over-running clutch ineffective and said second clutch effective.

3. In combination, a drive shaft, a driven shaft, a first positive drive means for driving the driven shaft from the drive shaft at a first speed, a second positive drive means for driving the driven shaft from the drive shaft at a second speed less than said first speed, a first clutch on said drive shaft interposed between said drive shaft and said first positive drive means and effective when engaged to drive said driven shaft at said first speed, a second clutch on said drive shaft interposed between said drive shaft and said second positive drive means and effective when engaged to provide a drive for said driven shaft at said second speed, an over-running clutch on said driven shaft and associated with said second clutch and interposed between said second positive drive means and said drive shaft and permitting said first positive drive means to drive said driven shaft at said first speed while said first and said second clutch are both engaged, and means for disengaging said first clutch to render said over-running clutch ineffective and said second clutch effective.

4. In combination, a first shaft rotatable in a first direction, a second shaft, a first means for driving the first shaft from the second shaft at a first speed, a second means for driving the first shaft from the second shaft at a speed less than said first speed, a first ratchet wheel secured to said second shaft, a first wheel rotatable on said second shaft, a first pawl carried on said first wheel and normally engaged with said first ratchet wheel and movable to disengage said first ratchet wheel, a first pawl moving means, a second ratchet wheel secured to said second shaft, a second wheel rotatable on said second shaft, a second pawl carried on said second wheel and normally engaged with said second ratchet wheel and movable to disengage said second ratchet wheel, said second ratchet wheel releasing said second pawl from driving engagment upon rotation of said second ratchet wheel in a direction opposite to said first direction, a second pawl moving means, and means for selectively moving said pawl moving means to move a pawl on a wheel and release a pawl from engagement.

5. In combination, a first shaft rotatable in a first direction, a second shaft, a first means for driving the first shaft from the second shaft at a first speed, a second means for driving the first shaft from the second shaft at a speed less than said first speed, a first ratchet wheel secured to said second shaft, a first wheel rotatable on said second shaft, a first pawl carried on said first wheel and normally engaged with said first ratchet wheel and movable to disengage said first ratchet wheel, a first pawl moving means, a second ratchet wheel secured to said second shaft, a second wheel rotatable on said second shaft, a second pawl carried on said second wheel and normally engaged with said second ratchet wheel and movable to disengage said second ratchet wheel, a second pawl moving means, and means for selectively moving said pawl moving means to move a pawl on a wheel and release a pawl from engagement.

6. In combination, a first shaft rotatable in a first direction, a second shaft, a first means for driving the first shaft from the second shaft at a first speed, a second means for driving the first shaft from the second shaft at a speed less than said first speed, a first ratchet wheel secured to said second shaft, a first wheel rotatable on said second shaft, a first pawl carried on said first wheel and normally engaged with said first ratchet wheel and movable to disengage said first ratchet wheel, a first pawl moving means normally positioning said pawl in engagement with said ratchet wheel, a second ratchet wheel secured to said second shaft, a second wheel rotatable on said second shaft, a second pawl carried on said second wheel and normally engaged with said second ratchet wheel and movable to disengage said second ratchet wheel, said second ratchet wheel releasing said second pawl from driving engagement upon rotation of said second ratchet wheel in a direction opposite to said first direction, a second pawl moving means normally positioning said pawl in engagement with said ratchet wheel, and means for selectively moving said pawl moving means to release a pawl from engagement.

7. In combination, a first shaft rotatable in a first direction, a second shaft, a first means for driving the first shaft from the second shaft at a first speed, a second means for driving the first shaft from the second shaft at a speed less than said first speed, a first ratchet wheel secured to said second shaft, a first wheel rotatable on said second shaft, a first pawl carried on said first wheel and normally engaged with said first ratchet wheel and movable to disengage said first ratchet wheel, a first pawl moving means normally positioning said pawl in engagement with said ratchet wheel, a second ratchet wheel secured to said second shaft, a second wheel rotatable on said second shaft, a second pawl carried on said second wheel and normally engaged with said second ratchet wheel and movable to disengage said second ratchet wheel, a second pawl moving means normally positioning said pawl in engagement with said ratchet wheel, and means for selectively moving said pawl moving means to move a pawl on a wheel and release a pawl from engagement.

EDRIC W. VREDENBURG.

REFERENCES CITED

The following references are of record in the file of this patent:

UNITED STATES PATENTS

| Number | Name | Date |
|---|---|---|
| 1,043,931 | Herrick | Nov. 12, 1912 |
| 1,136,636 | Wilkin | Apr. 20, 1915 |